Patented Mar. 22, 1949

2,464,992

UNITED STATES PATENT OFFICE 2,464,992

ESTERS OF ACYLOXYCARBOXYLIC ACIDS

Chessie E. Rehberg, Glenside, and Charles H. Fisher, Abington, Pa., assignors to the United States of America as represented by the Secretary of Agriculture No Drawing. Application October 10, 1946, Serial No. 702,349

4 Claims. (Cl. 260—410)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation in part of our copending application for patent, Serial No. 567,294, filed December 8, 1944, patented November 5, 1946, Patent No. 2,410,551.

Our invention relates to esters of alpha-acyloxycarboxylic acids and more particularly to compounds of the formula

R—COO—CH(R')—COO—R'' wherein R may represent a saturated aliphatic radical, particularly an alkyl radical such as methyl, ethyl, propyl, butyl, heptyl, and nonyl, an aryl radical such as phenyl, a haloaliphatic radical such as haloalkyl like mono-, di-, and tri-chloromethyl, dichlorobutyl, and so forth, a haloaryl radical such as halophenyl like chlorophenyl, and an alkaryl radical such as alkylphenyl like tolyl and xylyl; R' may represent a hydrogen atom or a methyl group; and R'' may represent an alkenyl radical such as allyl, beta-methylallyl, crotyl, methyl vinyl carbinyl, and so forth, a haloalkenyl radical such as beta-chloroallyl and gamma-chloroallyl, and an aralkenyl radical such as cinnamyl.

This invention has among its objects the production of compounds that are useful as solvents, plasticizers, insecticides, insect repellents, and chemical intermediates. Some of these compounds can be utilized as starting materials in the production of derivatives which are substances polymerizable into plastic, semi-solid or solid materials useful in industry because of their tensile strength, elasticity, plasticity, resistance to water, organic liquids and gases, and because of other desirable properties. Other objects will be apparent from the description of the invention.

In general, the alpha-acyloxycarboxylic acid esters having the afore-mentioned general formula are obtained by reacting an alpha-hydroxy-acid, such as glycolic or lactic acid, with an olefinic alcohol, and then reacting the olefinic alpha-hydroxy acid ester thus obtained (e. g., glycolate or lactate), with an acylating agent to form the olefinic alcohol ester of the corresponding acyloxy acid. Another suitable method involves reacting the acyloxy acid itself or the chloride or anhydride of the acyloxy acid, with the olefinic alcohol.

In preparing the compounds of the invention, the carboxyl group of the alpha-hydroxy or alpha-acyloxy carboxylic acid is esterified with any aliphatic or aromatic primary or secondary olefinic alcohol containing an olefinic double bond and which may contain, in addition, halogen substituents. Suitable alcohols include those in which the hydroxyl group is linked to an alkenyl radical containing the grouping

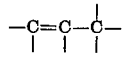

such as allyl alcohol, beta-methylallyl alcohol, crotyl alcohol, methyl vinyl carbinol, methyl propenyl carbinol, methyl isopropenyl carbinol, beta-gamma dimethyl allyl alcohol, gamma-gamma dimethyl allyl alcohol, beta-methyl gamma-isopropyl allyl alcohol; alcohols containing a haloalkenyl radical such as beta-chloroallyl alcohol and gamma-chloroallyl alcohol; and alcohols having the hydroxyl group linked to a phenylalkenyl radical, such as cinnamyl alcohol.

Any saturated aliphatic or aromatic monocarboxylic acid free of substituents other than halogen may be used as the acylating agent to esterify the alcoholic hydroxy group of the alpha-hydroxy carboxylic acid. Suitable acids are acetic, propionic, butyric, heptanoic, pelargonic, and other alkyl carboxylic acids; haloalkyl carboxylic acids such as mono-, di-, and tri-chloroacetic acids and beta- and gamma-dichlorobutyric acids; phenyl carboxylic acids such as benzoic acid; halophenyl carboxylic acids such as the various isomeric monochlorobenzoic acids and polychlorobenzoic acids; and alkylophenyl carboxylic acids such as toluic and xylic acids.

In conducting the acylation of the olefinic esters of the alpha-hydroxy acids, we prefer to use as the acylating agent the anhydride or the chloride of the monocarboxylic acid, although the free acid or an ester thereof may also be used.

In the following examples, which are illustrative of the invention, Examples I to XII, inclusive, represent the preparation of some olefinic alpha-hydroxy acid esters, and Examples XIII to XXIV, inclusive, describe the acylation of these esters to form the compounds of the invention.

EXAMPLE I

Preparation of allyl glycolate

Allyl glycolate was prepared by interacting glycolic acid with allyl alcohol and then distilling the reaction mixture to recover the ester. The procedure was similar to that of Example III, the principal exception being the use of glycolic acid instead of lactic acid.

EXAMPLE II

Preparation of allyl lactate

Two mols (180.2 g.) of essentially 100 percent lactic acid, 2.2 mols (127.8 g.) of allyl alcohol, 200 cc. of benzene, and 3 cc. of concentrated sulfuric acid were refluxed for three hours while water was continuously removed, as formed, by use of a trap. Benzene and unreacted allyl alcohol were removed by distillation under about 20 mm. pressure, after which allyl lactate was distilled under 1 mm. pressure, its boiling point under this pressure being 27° to 29° C. The yield was 88 g., or 34 percent of the theoretical. More of the ester, allyl lactate, was obtained by adding allyl alcohol, benzene and acid catalyst to the distillation residue, refluxing, and then distilling the reaction mixture as before.

EXAMPLE III

Preparation of allyl lactate

Two mols (180.2 g.) of essentially 100 percent lactic acid was dehydrated by refluxing with benzene, a trap being used to remove water. After complete removal of water (34 cc.) 6 mols of allyl alcohol was added and the mixture was refluxed for several hours. The benzene and excess alcohol were then removed by fractional distillation, the final stage being carried out under a pressure of about 20 mm. The allyl lactate was then distilled at 60° C. under 7 mm. pressure, 45 g. being obtained. The recovered alcohol was returned to the reaction vessel containing the distillation residue, 1 to 2 g. of p-toluenesulfonic acid was added, and the mixture again refluxed for several hours. Upon distillation, 159 g. of allyl lactate was obtained. The total yield was thus 204 g., or 78 percent of the theoretical. The residue (presumably polylactic acid) could doubtless be used again or added to a new batch of material, thus eventually converting virtually all of it into ester.

EXAMPLE IV

Preparation of allyl lactate

Ten mols (1125 g.) of 80 percent lactic acid, 400 ml. benzene, and 5 ml. sulfuric acid were refluxed in a still having a 3-ft. column fitted with a water trap at its top, water being drawn off, as it collected, at the rate of about 300 ml. in about 5 hours. When production of water became slow, 40 mols (2323 g.) of allyl alcohol were added, and refluxing continued with removal of about 220 cc. of water, containing some allyl alcohol, in about 20 hours. When no more water was produced, the flask was cooled, 20 g. of anhydrous sodium acetate was added to neutralize the sulfuric acid, and the benzene and about half the excess allyl alcohol were distilled at atmospheric pressure. The remainder of the alcohol was then distilled fairly rapidly under about 50 mm. pressure, after which the allyl lactate was rapidly distilled at 60° C. and at 7 mm. The yield was 1178 g., or 90.5 percent of the theoretical.

Allyl lactate is a clear, colorless, mobile liquid at room temperature, with a mild and not unpleasant odor. It boils at 60° C. under 7 mm. of mercury pressure, at 79° C. under 25 mm., and at 175.5° C. under 754 mm. pressure. It has a specific gravity of 1.0452 at 20° C., and a refractive index for the yellow sodium line at 20° C. of 1.4369.

EXAMPLE V

Preparation of beta-methylallyl lactate

Using essentially the same procedure of Example II, there was obtained from 3 mols (270 g.) of lactic acid and 3.3 mols (238 g.) of beta-methylallyl alcohol, 143 g. of beta-methylallyl lactate, this being 33 percent of the theoretical amount.

EXAMPLE VI

Preparation of beta-methylallyl lactate

Five mols (450 g.) of lactic acid and 5.5 mols (396 g.) of beta-methylallyl alcohol were treated as in Example II, the yield of ester being 212 g. The recovered alcohol was then returned to the reaction flask containing the lactic acid residue and refluxed for several hours. Distillation then gave 115 g. of ester. A third period of reflux of alcohol and lactic acid residue yielded 39 g. of ester, a fourth yielded 34 g., and a fifth, 16.6 g. Addition of 50 cc. of fresh alcohol and 1 cc. of phosphoric acid raised the yield in the sixth period to 29 g. A further addition of 100 cc. of alcohol gave a yield of 14 g. in the final reaction period, the total yield being 460 g., or 64.6 percent of the theoretical. The product was collected at 77° to 79° C. under 11 mm. pressure.

EXAMPLE VII

Preparation of beta-methylallyl lactate

Aqueous sodium lactate (84.5 g. of 64 percent by weight sodium lactate) and 67.8 g. of beta-methylallyl chloride were heated in a rocking stainless steel autoclave at 120° to 180° C. for 5 hours. A moderate yield of beta-methylallyl lactate was obtained by fractional distillation of the reaction mixture.

EXAMPLE VIII

Preparation of beta-methylallyl lactate

Beta-methylallyl lactate was obtained by interaction of methyl or ethyl lactate with beta-methylallyl alcohol. In this case 3 mols of methyl lactate, 6 mols of beta-methylallyl alcohol, and 10 g. of aluminum tert.-butoxide were mixed and refluxed in a still from with methanol was withdrawn as fast as it collected at the still-head. When production of methanol ceased, beta-methylallyl lactate was recovered from the reaction mixture by fractionation under reduced pressure. The yield was 70 percent of the theoretical.

Beta-methylallyl lactate is a clear, colorless, mobile liquid at room temperature with a mild odor. It has a boiling point of 69° C. under 8 mm. of pressure and a boiling point of 78° C. under 11 mm. It has a specific gravity of 1.0181 at 20° C. and a refractive index for the yellow sodium line at 20° C. of 1.4389.

EXAMPLE IX

Preparation of beta-chloroallyl lactate

Ten mols (1125 g.) of 80 percent lactic acid, 400 ml. benzene, and 5 ml. of sulfuric acid were refluxed in a still having a 3-ft. column fitted with a water trap at its top, water being drawn off, as it collected, at the rate of about 300 ml. in about 5 hours. When production of water became slow, 40 mols (3700 g.) of beta-chloroallyl alcohol were added and refluxing continued with removal of about 220 cc. of water in about 20 hours. When no more water was produced, the flask was cooled, 20 g. of anhydrous sodium acetate was added to neutralize the sulfuric acid, and the benzene and about half the excess beta-chloroallyl alcohol were distilled at atmospheric pressure. The remainder of the alcohol was then distilled fairly rapidly under 50 mm. pressure, after which the beta-chloroallyl lactate was distilled at about 83° C. and at 5 mm. pressure. The yield was 76 percent of the theoretical.

EXAMPLE X

*Preparation of gamma-chloroallyl lactate*

Gamma-chloroallyl lactate was prepared by the alcoholysis of methyl or ethyl lactate. In this case 3 mols (312 g.) of methyl lactate, 6 mols (555 g.) of gamma-chloroallyl alcohol, and 10 g. of aluminum tert.-butoxide were mixed and refluxed in a still from which methanol was withdrawn as fast as it collected at the stillhead. When production of methanol ceased, the excess alcohol was distilled at 54° C. and at 13 mm., after which the product, gamma-chloroallyl lactate, was obtained at 105° C. and at 12 mm. The yield was 65 percent of the theoretical.

EXAMPLE XI

*Preparation of methyl vinyl carbinyl lactate*

The procedure of Example IX was slightly modified to prepare methyl vinyl carbinyl lactate since methyl vinyl carbinol is somewhat unstable in the presence of sulphuric acid. In this case, the lactic acid, alcohol and benzene were mixed and refluxed with removal of water until little water was produced. Then 10 g. of p-toluenesulfonic acid was added and heating continued. When no more water was produced the catalyst was neutralized and the product distilled as described in Example IX.

EXAMPLE XII

*Preparation of crotyl lactate*

The same procedure as in Example XI was followed to prepare crotyl lactate, since crotyl alcohol is also unstable in the presence of sulfuric acid.

EXAMPLE XIII

*Preparation of allyl alpha-propionoxyacetate*

One gram of sulfuric acid was dissolved in 1 mol (116 g.) of allyl glycolate in a flask fitted with stirrer, dropping funnel and reflux condenser, and 1.1 mols (143 g.) of propionic anhydride was slowly added with agitation and while maintaining the reaction mixture at about 60° to 80° C. The contents of the flask were then heated at 100° C. for 2 hours, allowed to stand overnight at 25° C., and then distilled under reduced pressure. Allyl alpha-propionoxyacetate was collected at about 63° C. under 1.2 mm.

EXAMPLE XIV

*Preparation of allyl alpha-acetoxypropionate*

To 1.5 mols (195 g.) of allyl lactate there was slowly added, with stirring, 1.65 mols (168 g.), 10 percent excess, of acetic anhydride. The mixture was warmed to 50° to 60° C. to start the reaction, after which cooling was used to keep the temperature below 100° to 110° C. After standing an hour, the mixture was fractionated under a pressure of 7 mm., the product being collected at 80° to 81° C. The yield was 230 g., or 89 percent of the theoretical.

Allyl alpha-acetoxypropionate is a clear, colorless, mobile liquid of slight, though pleasant odor. It has a boiling point of 81° C. under 7 mm. pressure, a specific gravity of 1.0544 at 20° C., and a refractive index for the yellow sodium line at 20° C. of 1.4270.

EXAMPLE XV

*Preparation of beta-methylallyl alpha-acetoxypropionate*

Using essentially the procedure described in Example XIV, except that 1 to 2 cc. phosphoric acid was used as a catalyst and the temperature was maintained at 60° to 80° C., there was obtained from 1.5 mols of beta-methylallyl lactate and 1.8 mols of acetic anhydride a yield of 260 g. of beta-methylallyl alpha-acetoxypropionate, this being 93 percent of the theoretical yield. The product was collected at 100° to 102° C. at 12 mm. pressure.

Beta-methylallyl alpha-acetoxypropionate is a clear, colorless, mobile liquid with a slight, though pleasant odor. It has boiling points of 76° C. under 3 mm., 87° C. under 5 mm., and 95° C. under 10 mm. pressure. It has a specific gravity of 1.0330 at 20° C., and a refractive index for the yellow sodium line at 20° C. of 1.4314.

EXAMPLE XVI

*Preparation of beta-chloroallyl alpha-acetoxypropionate*

Beta-chloroallyl alpha-acetoxypropionate was prepared by interacting beta-chloroallyl lactate with acetic anhydride and then distilling to recover the ester, the procedure being essentially that used in Example XIV.

EXAMPLE XVII

*Preparation of gamma-chloroallyl alpha-acetoxypropionate*

Using the procedure of Example XIV, gamma-chloroallyl alpha-acetoxypropionate was prepared by reacting gamma-chloroallyl lactate and acetic anhydride.

EXAMPLE XVIII

*Preparation of methyl vinyl carbinyl alpha-acetoxypropionate*

Methyl vinyl carbinyl alpha-acetoxypropionate was prepared by reacting methyl vinyl carbinyl lactate with acetic anhydride, using essentially the same procedure as in Example XX.

EXAMPLE XIX

*Preparation of crotyl alpha-acetoxypropionate*

Crotyl alpha-acetoxypropionate was prepared by reacting crotyl lactate with acetic anhydride, using the same general procedure as in Example XX.

EXAMPLE XX

*Preparation of allyl alpha-butyroxypropionate*

One gram of sulfuric acid was dissolved in 1 mol (130 g.) of allyl lactate in a flask fitted with stirrer, dropping funnel and reflux condenser, and 1.1 mols (174 g.) of butyric anhydride was slowly added with agitation and while maintaining the reaction mixture at about 60° to 80° C. The contents of the flask were then heated at 100° C. for 2 hours, allowed to stand overnight at 25° C., and distilled under reduced pressure. Allyl alpha-butyroxypropionate was collected at about 59° C. under 0.5 mm. The yield was 178 grams.

EXAMPLE XXI

*Preparation of beta-methylallyl alpha-propionoxypropionate*

Using the same general procedure as in Example XX, beta-methylallyl alpha-propionoxypropionate was prepared by reacting beta-methylallyl lactate with propionic anhydride.

EXAMPLE XXII

*Preparation of allyl alpha-pelargonoxypropionate*

One mol (130 g.) of allyl lactate and 1 mol (79 g.) of pyridine were mixed in a flask fitted with a stirrer and a dropping funnel. One mol (177 g.) of pelargonyl chloride was then added slowly, with stirring, the temperature of the mixture being kept at 0–10° during the addition.

After standing one hour at room temperature the mixture was washed with water and distilled under reduced pressure. The yield was 190 g. of allyl alpha-pelargonoxypropionate which distilled at 100°–102° (0.2 mm.).

EXAMPLE XXIII

*Preparation of beta-chloroallyl alpha-heptoyloxypropionate*

Beta-chloroallyl alpha-heptoyloxypropionate was prepared by reacting beta-chloroallyl lactate with heptanoic acid chloride in the presence of pyridine, using essentially the same procedure as in Example XXII.

EXAMPLE XXIV

*Preparation of allyl alpha-benzoyloxypropionate*

Using the procedure described in Example XXII, allyl alpha-benzoyloxypropionate was prepared by reacting allyl lactate with benzoyl chloride in the presence of pyridine.

The following table illustrates the properties of some of these compounds:

| Ester | B. P., °C. | Press., mm. | $N_D^{20}$ | $d_4^{20}$ |
|---|---|---|---|---|
| Allyl glycolate | 72 | 8 | 1.4418 | 1.0901 |
| Beta-chloroallyl locate | 83 | 5 | 1.4627 | 1.2153 |
| Gamma-chloroallyl lactate | 106 | 12 | 1.4670 | 1.2166 |
| Crotyl lactate | 92 | 18 | 1.4420 | 1.0106 |
| Methyl vinyl carbinyl lactate | 58 | 8 | 1.4326 | 1.0091 |
| Beta-chloroallyl alpha-acetoxypropionate | 96 | 5 | 1.4460 | 1.1792 |
| Crotyl alpha-acetoxypropionate | 94 | 8 | 1.4347 | 1.0338 |
| Methyl vinyl carbinyl alpha-acetoxypropionate | 80 | 8 | 1.4256 | 1.0233 |
| Allyl alpha-butyroxypropionate | 59 | 0.5 | 1.4304 | 1.0110 |
| Allyl alpha-propionoxyacetate | 63 | 1.2 | 1.4321 | 1.0668 |
| Beta-methylallyl alpha-propionoxypropionate | 85 | 3.5 | 1.4324 | 1.0117 |
| Allyl alpha-pelargonoxypropionate | 102 | 0.2 | 1.4400 | 0.9568 |
| Beta-chloroallyl alpha-heptoyloxypropionate | 107 | 0.4 | 1.4480 | 1.0544 |
| Allyl alpha-benzoyloxypropionate | 108 | 0.1 | 1.5042 | 1.1113 |

Having thus described our invention, we claim:

1. A compound selected from the group consisting of allyl alpha-pelargonoxypropionate, beta-chloroallyl alpha-heptoyloxypropionate, and allyl alpha-benzoyloxypropionate.
2. Beta-chloroallyl alpha-heptoyloxypropionate.
3. Allyl alpha-pelargonoxypropionate.
4. Allyl alpha-benzoyloxypropionate.

CHESSIE E. REHBERG.
CHARLES H. FISHER.

REFERENCES CITED

The following references are of record in the file of this patent:

UNITED STATES PATENTS

| Number | Name | Date |
|---|---|---|
| 2,183,357 | Ritchie | Dec. 12, 1939 |
| 2,367,798 | Rehberg et al. I | Jan. 23, 1945 |
| 2,388,440 | Rehberg et al. II | Nov. 6, 1945 |
| 2,410,551 | Rehberg III | Nov. 5, 1946 |

OTHER REFERENCES

Jones et al., "Jour. Chem. Soc." (London, 1935), pp. 400–406.

Fisher et al., "Jour. Am. Chem. Soc.," vol. 65 (1943), pp. 763–767.